United States Patent [19]

Fila et al.

[11] 3,853,393
[45] Dec. 10, 1974

[54] TUBE MEANS WITHIN AN INJECTION-MOLDED TEMPLE FOR ACCOMMODATING ELECTRIC CONDUCTORS THEREIN

[75] Inventors: Jurgen Fila; Joachim Kwiatkowski, both of Berlin, Germany

[73] Assignee: Robert Bosch Electronik GmbH, Berlin, Germany

[22] Filed: Aug. 28, 1973

[21] Appl. No.: 392,175

[30] Foreign Application Priority Data
Sept. 22, 1972  Germany............................ 2246737

[52] U.S. Cl. .............. 351/111, 179/107 S, 351/158
[51] Int. Cl. .......................... G02c 5/14, H04r 25/00
[58] Field of Search .......... 351/111, 158; 179/107 S

[56] References Cited
UNITED STATES PATENTS
3,119,903   1/1964   Rosemond et al............... 179/107 S Primary Examiner—Paul A. Sacher
Attorney, Agent, or Firm—Spencer & Kaye

[57] ABSTRACT

In an injection-molded hearing aid-type eyeglass temple which includes a straight temple portion having a first cavity and an adjoining, inclined free end portion having a second cavity, there is provided a thin-walled tube embedded in a solid temple portion. The throughgoing longitudinal passage in the tube constitutes a connecting channel which maintains communication between the two cavities and through which extend electric conductors for interconnecting the hearing aid components accommodated in the two cavities.

7 Claims, 6 Drawing Figures

TUBE MEANS WITHIN AN INJECTION-MOLDED TEMPLE FOR ACCOMMODATING ELECTRIC CONDUCTORS THEREIN

BACKGROUND OF THE INVENTION

This invention relates to a method of making a hearing aid-type eyeglass temple having a straight portion and an adjoining free end portion that is at an inclined angle with respect to the straight portion and which, during use, is located behind the ear of the wearer. The temple is further of the type which has, in its straight portion, an externally accessible cavity for a microphone, an amplifier, and other components, and which has, in the free end portion, an externally accessible cavity for a battery. The two cavities which are separated from one another by a temple portion formed of a solid material are in communication with one another by means of a connecting channel which is adapted to receive electrical conductors. It is expedient to manufacture temples of the afore-outlined type by means of injection molding, since the finishing is relatively simple and the temples so made have significant strength and stability. In particular, the arcuate portion between the straight temple portion and the free end portion is solid. This is significant because the temple portion which extends over the ear has to be heated and bent for individual fitting and is, therefore, submitted to relatively large stresses. The aforenoted cavities which are formed in the temple during injection and which are separated from one another by the solid temple portion, have to communicate, as also noted earlier, by means of a channel in which electrical conductors are disposed.

According to a known method of making a temple of the aforeoutlined type, the connecting channel between the two cavities is provided by milling a groove in the underside of the temple. The thus outwardly open channel is subsequently covered by an insert which conforms to the shape of the temple and which is glued thereto.

According to another known method, the connecting channel is provided by drilling a bore through the molded solid material of the temple.

Temple structures obtained by the afore-outlined known methods of manufacture have a number of significant disadvantages.

As it was mentioned before, during fitting to the head of the wearer, the temple has to be heated and bent to a greater or lesser extent. During such an operation, the conductors already disposed in the connecting channel are, because of the resulting narrowing of the channel, often clamped or torn, whereby a proper electric connection between components in the two cavities is likely to be interrupted.

Further, in case of drilled channels, the threading of the extremely thin and flexible conductors into the small-gauge bore hole renders the assembling operation quite difficult and thus requires a great skill.

A subsequently attached insert, on the other hand, is liable to separate in use and, further, the locations of abutment between temple and insert adversely affect the smooth outer face of the injection-molded temple from an aesthetic point of view.

SUMMARY OF THE INVENTION

It is an object of the invention to provide a method of making an improved temple structure which is free from the afore-discussed disadvantages.

It is a further object of the invention to provide an eyeglass temple of such an improved structure.

These objects and others to become apparent as the specification progresses are accomplished by the invention according to which, briefly stated, in the otherwise conventional injection mold, for the purpose of forming the aforenoted connecting channel, an open-ended tube is positioned with the aid of tools that obturate the ends of the tube, then a thermoplastic material is injected into the mold for forming the temple and embedding the tube therein, and removing the tools from the injection-molded temple.

DESCRIPTION OF THE PRIOR ART

Figure 1:
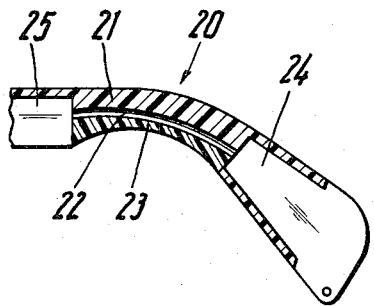
FIG. 1 is a longitudinal sectional view of a known temple structure obtained by a known manufacturing method.

Turning now to FIG. 1, there is shown the free end portion 20 of a known temple structure forming part of hearing aid-type eyeglasses. The connecting channel 22 which maintains communication between the cavities 24 and 25 and in which there are subsequently deposited electric conductors for connecting the hearing aid components disposed in the cavities 24 and 25, is provided in the solid temple portion 21, subsequent to the molding of the temple, by milling a groove in the underside of the portion 21. The thus downwardly open groove is subsequently longitudinally covered by an insert 23 which is bonded to the temple.

Figure 2:
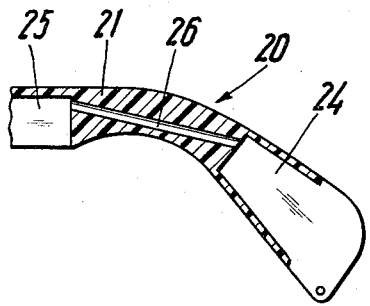
FIG. 2 is a longitudinal sectional view of another known temple structure obtained by a known manufacturing method.

FIG. 2 illustrates the free end portion 20 of another known temple structure in which the connecting channel 26 is provided in the solid portion 21 by drilling a bore hole subsequent to the molding of the temple.

The common and individual disadvantages of the structures illustrated in FIGS. 1 and 2 have previously been set forth.

DESCRIPTION OF THE PREFERRED EMBODIMENTS OF THE INVENTION

Figure 3:
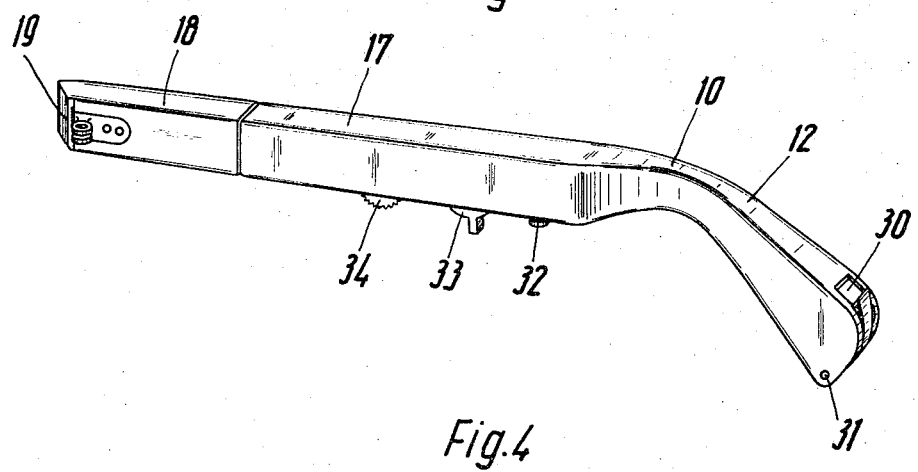
FIG. 3 is a perspective view of a completed temple made with a process according to the invention.
Figure 4:
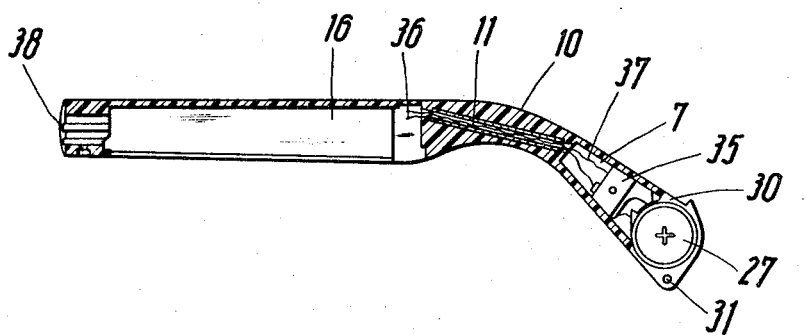
FIG. 4 is a longitudinal sectional view of a length portion of the temple illustrated in FIG. 3.

Turning now to FIGS. 3 and 4, the completed eyeglass temple is formed of a straight portion 17 and an inclined portion 12 which, in use, is disposed behind the ear of the wearer. In the portion 17 there is provided a cavity 16 adapted to receive a microphone, an amplifier and other components of a hearing aid. The inclined temple portion 12 includes a cavity 7 which is adapted to accommodate a hearing air battery 27. Between the portions 17 and 12 there extends a solid temple portion 10 in which there is embedded a connecting channel 1 defined by the inner wall of a tube 2. Through the connecting channel 1 there extend electric conductors 11 which connect the hearing air battery 27 disposed in the cavity 7 with the amplifier contained in the cavity 16.

The integral temple portion 10, 12, 17 is manufactured according to the invention in a manner now to be described with reference to FIGS. 5 and 6.

In a two-part conventional steel mold (not shown) there is positioned a tube 2 which may be, for example, a thin-walled brass member, or which may be made of any other material that remains unaffected by temperatures prevailing during the injection molding of the temple, but yields in response to bending forces imparted to the temple during the fitting of the eyeglass.

Tube 2, for example, could have an outer diameter of 1.5 mm and an inner diameter of 1.1 mm, and would thus have a wall thickness of 0.2 mm. The length of tube 2 is about 25.5 mm. The material of which tube 2 is made could be a copper-nickel-zinc-alloy (German silver).

In the mold there are also positioned a pusher tool 3 and an ejector tool 5 in such a manner that they occupy solely that volume of the mold in which the cavities 7 and 16 of the temple will be formed. Between the front faces of tools 3 and 5 oriented towards one another in the mold, there extends a space which, subsequent to the injection of thermoplastic material, will be filled by the solid temple portion 10 between the externally accessible cavities 7 and 16. The tube 2 extends through the aforenoted space in the mold and is, at both ends, engaged by the tools 3 and 5. It is thus seen that during the injection molding process the tube 2 will be embedded in the solid temple portion 10 and becomes a permanent part thereof. The thermoplastic material may be, for example, a commercially available synthetic resin such as cellulose acetate.

The tools 3 and 5 are provided with respective projections 4 and 6 which are oriented towards one another and which are shaped in such a manner that they completely seal the free ends of the tube 2 and thus prevent the injected material from entering the channel 1. Preferably, the projections 4 and 6 are of conical shape to thus form in the temple portion 10 two conically flaring ducts 13 and 14 between either end of the tube 2 and the respective cavities 7 and 16. These flaring ducts facilitate the threading of the conductors 11 into the tube 2. Expediently, the projections 4 and 6 may have the shape of a four-sided pyramid and thus are in a form-locking engagement with the ends of the tube 2 for more securely holding and positioning the latter during the injection step.

The ejection tool 5 has an extension 15 which occupies that volume portion of the mold in which eventually the elongated cavity 16 of the temple is formed. It is thus seen that the tools 3, 5, 15 have two basic functions: they position the tube 2 within the mold during the injection molding of the temple and, as core members, define the cavities 7 and 16 of the temple.

Figure 5:
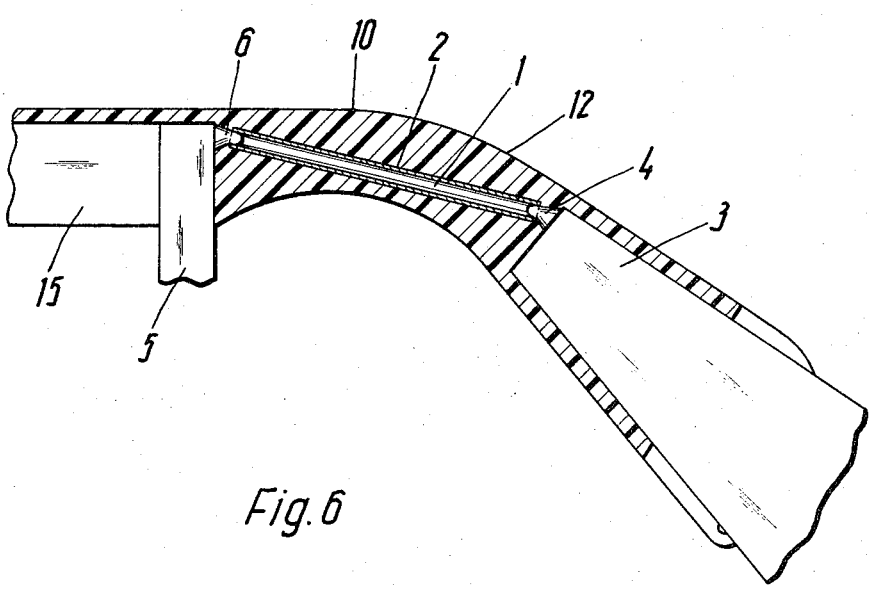
FIGS. 5 and 6 are enlarged longitudinal sectional views of one part of the temple structure illustrated in FIG. 4, with and without supporting tools, respectively.
Figure 6:
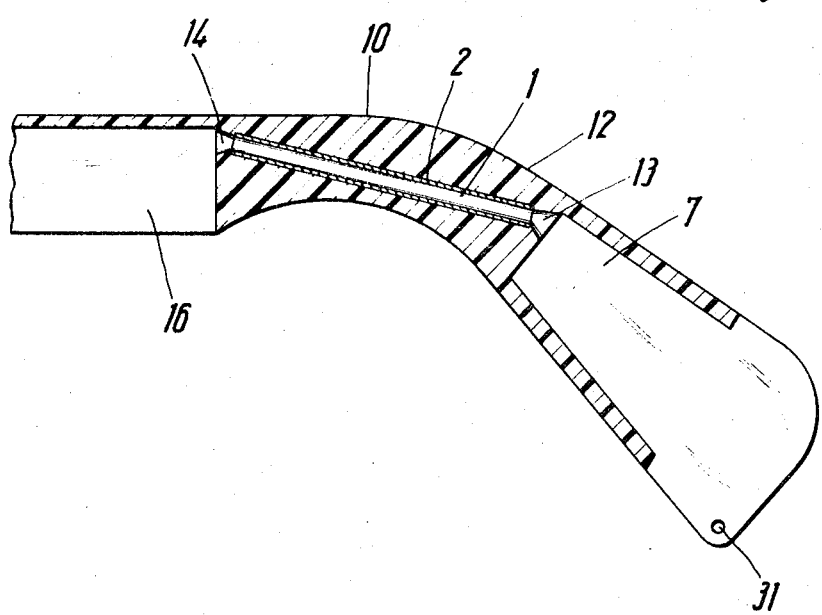

Subsequent to the cooling of the injected material, the tools 3 and 5 which are shown still in position in FIG. 5, are removed and the completed injection-molded temple is lifted out of the mold (FIG. 6).

Referring once again to FIG. 4, in the connecting channel 1 defined by the tube 2 there are inserted conductors 11 the end portions 37 of which extend into the cavity 7 and are attached to the contact spring block 35 which, in turn, is electrically connected with the battery 27 inserted in a battery casing 30. The battery casing 30 is pivotably secured in the cavity 7 at 31 and in its closed position, conforms to the external contour of the temple. The other end portions 36 of the conductors 11 lead to the electrical components disposed in the cavity 16.

In FIG. 3 there is shown, the fully assembled temple in its external appearance. The straight portion 17 fully surrounds the cavity 16 accommodating the electrical components and carries manually operable parts, such as a switch 33, and a volume control knob 34. A coupling nipple 32 is provided for an air hose leading to the hearing aid.

To that end 38 of the straight temple portion 17 which is remote from the free inclined end portion 12, there is conventionally attached a fittable connecting portion 18 including a hinge 19 by means of which the temple is mounted to the eyeglass frame.

It will be understood that the above description of the present invention is susceptible to various modifications, changes and adaptations, and the same are intended to be comprehended within the meaning and range of equivalents of the appended claims.

We claim:

1. In an injection-molded hearing aid-type eyeglass temple having a straight portion and an adjoining inclined free end portion, each temple portion including a cavity for accomodating electric components of the hearing aid; the cavities are separated from one another by a solid temple portion and communicate with one another by a connecting channel passing through the solid temple portion and accommodating electric conductors for connecting the electric components in the cavities, the improvement comprising an open-ended tube embedded in said solid temple portion, said tube having a throughgoing longitudinal passage constituting said connecting channel.

2. An eyeglass temple as defined in claim 1, wherein said tube is made of a material that remains unaffected by temperatures prevailing during the injection molding of said temple and yields in response to bending forces imparted to the temple during fitting.

3. An eyeglass temple as defined in claim 2, wherein said tube is made of a material that softens at a temperature above the temperatures prevailing during the injection-molding of said temple.

4. An eyeglass temple as defined in claim 3, wherein said material is a metal.

5. An eyeglass temple as defined in claim 4, wherein said metal is brass.

6. An eyeglass temple as defined in claim 1, wherein said tube is thin-walled.

7. An eyeglass temple as defined in claim 1, including means defining flared ducts in said solid temple portion, said flared ducts connect each end of said passage with an adjacent one of said cavities, each said flared duct widens towards the adjoining cavity.

* * * * *

UNITED STATES PATENT OFFICE
CERTIFICATE OF CORRECTION

Patent No. 3,853,393        Dated December 10th, 1974

Inventor(s) Jürgen Fila et al

It is certified that error appears in the above-identified patent and that said Letters Patent are hereby corrected as shown below:

In the heading of the patent, under [73] Assignee, change "Electronik" to --Elektronik--.

Column 2, line 66, change "air" to --aid--.

Column 3, line 3, change "air" to --aid--.

Signed and sealed this 4th day of February 1975.

(SEAL)
Attest:

McCOY M. GIBSON JR.          C. MARSHALL DANN
Attesting Officer            Commissioner of Patents